US009536200B2

(12) United States Patent
Allen et al.

(10) Patent No.: US 9,536,200 B2
(45) Date of Patent: Jan. 3, 2017

(54) SENTIMENT ANALYSIS OF DATA LOGS (71) Applicant: International Business Machines Corporation, Armonk, NY (US)

(72) Inventors: Corville O. Allen, Morrisville, NC (US); Kevin B. Haverlock, Cary, NC (US); Michael D. Whitley, Weddington, NC (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/011,901

(22) Filed: Aug. 28, 2013

(65) Prior Publication Data

US 2015/0066814 A1  Mar. 5, 2015

(51) Int. Cl.
G06F 17/30 (2006.01)
G06N 5/04 (2006.01)
G06F 17/27 (2006.01)

(52) U.S. Cl.
CPC ........... *G06N 5/041* (2013.01); *G06F 17/2785* (2013.01)

(58) Field of Classification Search
None
See application file for complete search history.

(56) References Cited

U.S. PATENT DOCUMENTS

| 6,574,792 | B1* | 6/2003 | Easton ................ G06F 11/3664 704/9 |
| 7,216,056 | B2 | 5/2007 | Kubota et al. |
| 7,249,312 | B2 | 7/2007 | Jasper et al. |
| 8,090,727 | B2 | 1/2012 | Lachtarnik et al. |
| 8,417,713 | B1* | 4/2013 | Blair-Goldensohn et al. .............................. 707/751 |
| 2002/0087949 | A1* | 7/2002 | Golender .............. G06F 9/4446 717/124 |
| 2006/0015853 | A1* | 1/2006 | Babineau ............ G06F 11/3636 717/127 |
| 2009/0125371 | A1* | 5/2009 | Neylon et al. .................. 705/10 |
| 2009/0327809 | A1* | 12/2009 | Joy ....................... G06F 11/366 714/26 |
| 2011/0137906 | A1* | 6/2011 | Cai et al. ...................... 707/740 |
| 2012/0278064 | A1* | 11/2012 | Leary ................... G06F 17/274 704/9 |
| 2012/0310627 | A1* | 12/2012 | Qi et al. ........................... 704/9 |
| 2012/0331439 | A1* | 12/2012 | Zimmermann ..... G06F 11/3604 717/101 |
| 2013/0046771 | A1* | 2/2013 | Moitra .............. G06F 17/30705 707/749 |
| 2013/0231920 | A1* | 9/2013 | Mathew et al. .................. 704/9 |
| 2013/0268262 | A1* | 10/2013 | Moilanen et al. ................ 704/9 |
| 2014/0279838 | A1* | 9/2014 | Tsirogiannis ..... G06F 17/30917 707/603 |
| 2015/0006519 | A1* | 1/2015 | Jain .................. G06F 17/30699 707/723 |

* cited by examiner

*Primary Examiner* — Tarek Chbouki
*Assistant Examiner* — Eddy Cheung
(74) *Attorney, Agent, or Firm* — VanLeeuwen & VanLeeuwen; Reza Sarbakhsh

(57) ABSTRACT

An approach is provided to use natural language processing (NLP) to analyze data logs. In the approach, a data log is analyzed with the data log including a number of entries. The analysis performed includes performance of a sentiment analysis of the entries using natural language processing. The result of the sentiment analysis results is a sentiment score. Entries from the data log are then visually highlighted based on their corresponding sentiment scores.

17 Claims, 8 Drawing Sheets

SENTIMENT ANALYSIS OF DATA LOGS

BACKGROUND OF THE INVENTION

Software tracing provides developers with data logs of useful information for program debugging, development, and maintenance. Data logs resulting from software tracing, or debugging, are used both during the development cycle and after the software is released. Because software tracing is low-level, there are often many types of messages written to the data log. The information written to the data log represents the developers' commentary as the application is running. The information in the data log can represent entry or exit messages, variable values, unusual events that occurred, or error conditions that should not occur when the program is operating properly. The unstructured developer created messages included in a data log often represent the positive responses, negative opinions, emotions, and other developer evaluations of software execution. Because software tracing is performed at a low level, data logs can be quite large in size, making traditional analysis of the data logs to glean sentiment data difficult or impossible.

With the increased usage of computing networks, such as the Internet, humans are currently inundated and overwhelmed with the amount of information available to them from various structured and unstructured sources, such as the information presented in a traditional data log. However, information gaps abound as users try to piece together what they can find that they believe to be relevant during evaluation of information on various subjects, such as when analyzing entries in a traditional data log. To assist with such evaluations, recent research has been directed to generating knowledge management systems which may take an input, analyze it, and return results indicative of the most probable results to the input. Knowledge management systems provide automated mechanisms for searching through a knowledge base with a large set of sources of content, e.g., electronic documents, and analyzing them with regard to an input to determine a result and a confidence measure as to how accurate the result is in relation to the input.

One such knowledge management system is the Watson™ system available from International Business Machines (IBM) Corporation of Armonk, N.Y. The Watson™ system is an application of advanced natural language processing, information retrieval, knowledge representation and reasoning, and machine learning technologies to the field of open domain question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

An approach is provided to use natural language processing (NLP) to analyze data logs. In the approach, a data log is analyzed with the data log including a number of entries. The analysis performed includes performance of a sentiment analysis of the entries using natural language processing. The result of the sentiment analysis results is a sentiment score. Entries from the data log are then visually highlighted based on their corresponding sentiment scores.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
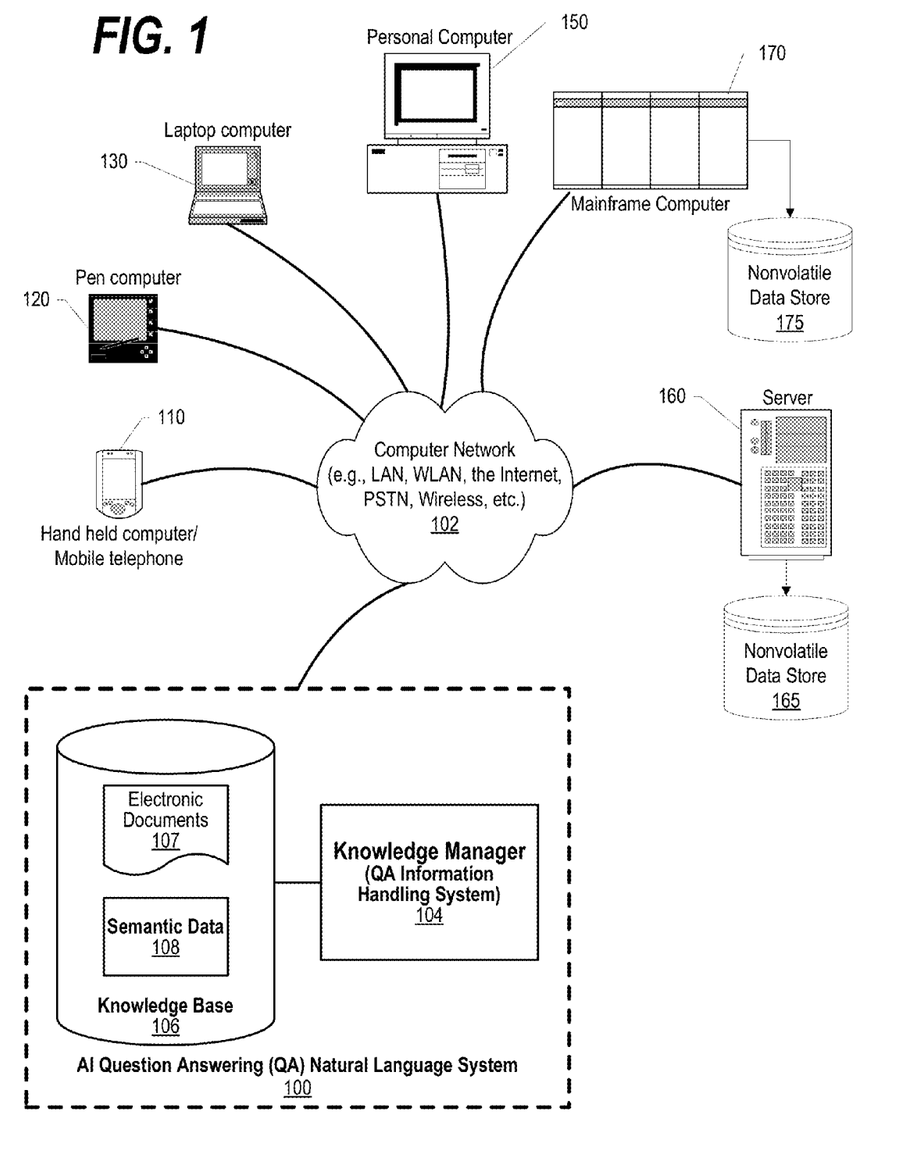
FIG. 1 is a block diagram of a data processing system in which the methods described herein can be implemented.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. Knowledge manager 104 may include a computing device (comprising one or more processors and one or more memories, and potentially any other computing device elements generally known in the art including buses, storage devices, communication interfaces, and the like) connected to the computer network 102. The network 102 may include multiple computing devices in communication with each other and with other devices or components via one or more wired and/or wireless data communication links, where each communication link may comprise one or more of wires, routers, switches, transmitters, receivers, or the like. Knowledge manager 104 and network 102 may enable question/answer (QA) generation functionality for one or more content users. Other embodiments of knowledge manager 104 may be used with components, systems, sub-systems, and/or devices other than those that are depicted herein.

Knowledge manager 104 may be configured to receive inputs from various sources. For example, knowledge manager 104 may receive input from the network 102, a corpus of electronic documents 106 or other data, a content creator 108, content users, and other possible sources of input. In one embodiment, some or all of the inputs to knowledge manager 104 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 104 may operate in environments of any size, including local and global, e.g., the Internet.

In one embodiment, the content creator creates content in a document 106 for use as part of a corpus of data with knowledge manager 104. The document 106 may include any file, text, article, or source of data for use in knowledge manager 104. Content users may access knowledge manager 104 via a network connection or an Internet connection to the network 102, and may input questions to knowledge manager 104 that may be answered by the content in the corpus of data. In one embodiment, the questions may be formed using natural language. Knowledge manager may interpret the question and provide a response to the content user containing one or more answers to the question. In some embodiments, knowledge manager 104 may provide a response to users in a ranked list of answers.

In some illustrative embodiments, AI QA Natural Language System 100 may be the Watson™ QA system available from International Business Machines Corporation of Armonk, N.Y., which is augmented with the mechanisms of the illustrative embodiments described hereafter. The Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model may then be used to summarize a level of confidence that the Watson™ QA system has regarding the evidence that the potential response, i.e. candidate answer, is inferred by the question. This process may be repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
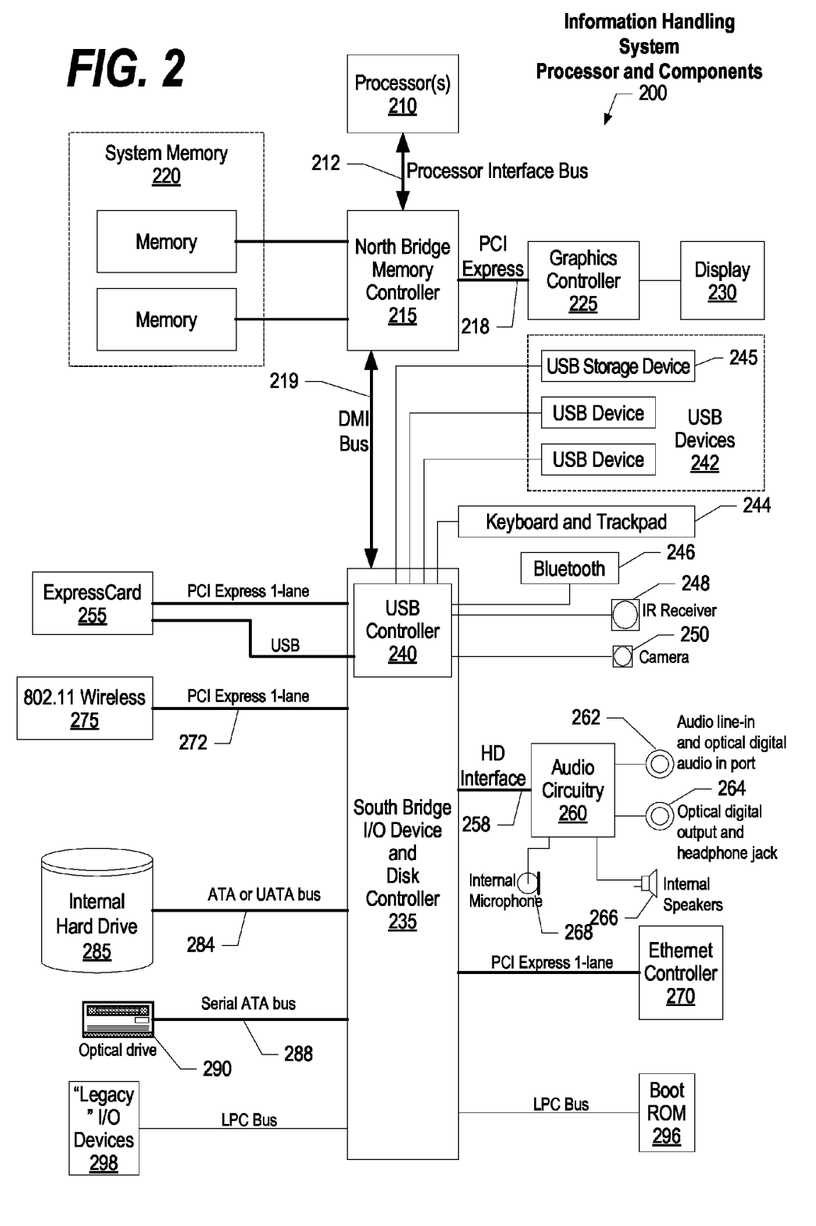
FIG. 2 provides an extension of the information handling system environment shown in FIG. 1 to illustrate that the methods described herein can be performed on a wide variety of information handling systems which operate in a networked environment.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wirelessly communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system using a knowledge management system, such as knowledge manager 100 shown in FIG. 1. A system and method to analyze data logs using sentiment analysis is shown and described. Automated sentiment analysis is an application of text analytics techniques for the identification of subjective opinions in text data. Sentiment analysis performed on the data log results in the classification of data log entries into categories such as "positive", "negative" and in some cases "neutral". Sentiment analysis is rather difficult because words often take different meanings and are associated with distinct emotions depending on the domain, or context, in which they are being used. For example, the use of a word like "fingerprints" may represent a major breakthrough (positive) in a criminal investigation, however the same word may be a major problem (negative) for appliance manufacturers. In a second example, "freezing" is a good quality for a refrigerator-freezer, but a bad quality for software applications. In a third example, a word such as "predictable" may be good for a stock market analysis or an automobile, however this same word may be bad when related to a movie or book.

In relation to software data logs, the trace and debug information represent a set of running developer-provided commentary of the application. Consider the following set of example data log entries:
1) logger.log(Level.TRACE,"Exiting question validation");
2) logger.debug("The context URL "+context+" is inValid");
3) logger.debug("The context URL "+context+" returned a non-200 HTTP status code");

The first data log entry is an entry exit, while the second two entries record unusual information that might be of benefit to someone trying to debug a problem. In the approach described herein, an aspect of natural language processing is used to apply sentiment analysis against data log files. The sentiment analysis identifies negative sentiment to flag logging information which may assist in identifying areas of interest in a data log. In one embodiment, the analysis utilizes a lexicon and knowledge base check against a sentiment model for positive or negative entries. These positive or negative entries are then matched against a proximity learning model which is further matched against the source code analysis model. The result of the various models is an overall sentiment score which can indicate positive, negative, and/or neutral sentiment to a particular section or line of data logs. Using the above data log entries as an example, the logger message for (1) would be viewed as neutral and not contain negative or positive polarity. However, entries (2) and (3) would be viewed as negative. Furthermore, the sentiment analysis would generate a stronger negative sentiment score for the entry with the word "invalid" than the entry with the term "non-200". The approach discussed above is further described in FIGS. 3-8 and accompanying detailed descriptions, discussed below, which provide further details related to one or more embodiments that highlight entries in a data log based upon a sentiment analysis performed on the log.

Figure 3:
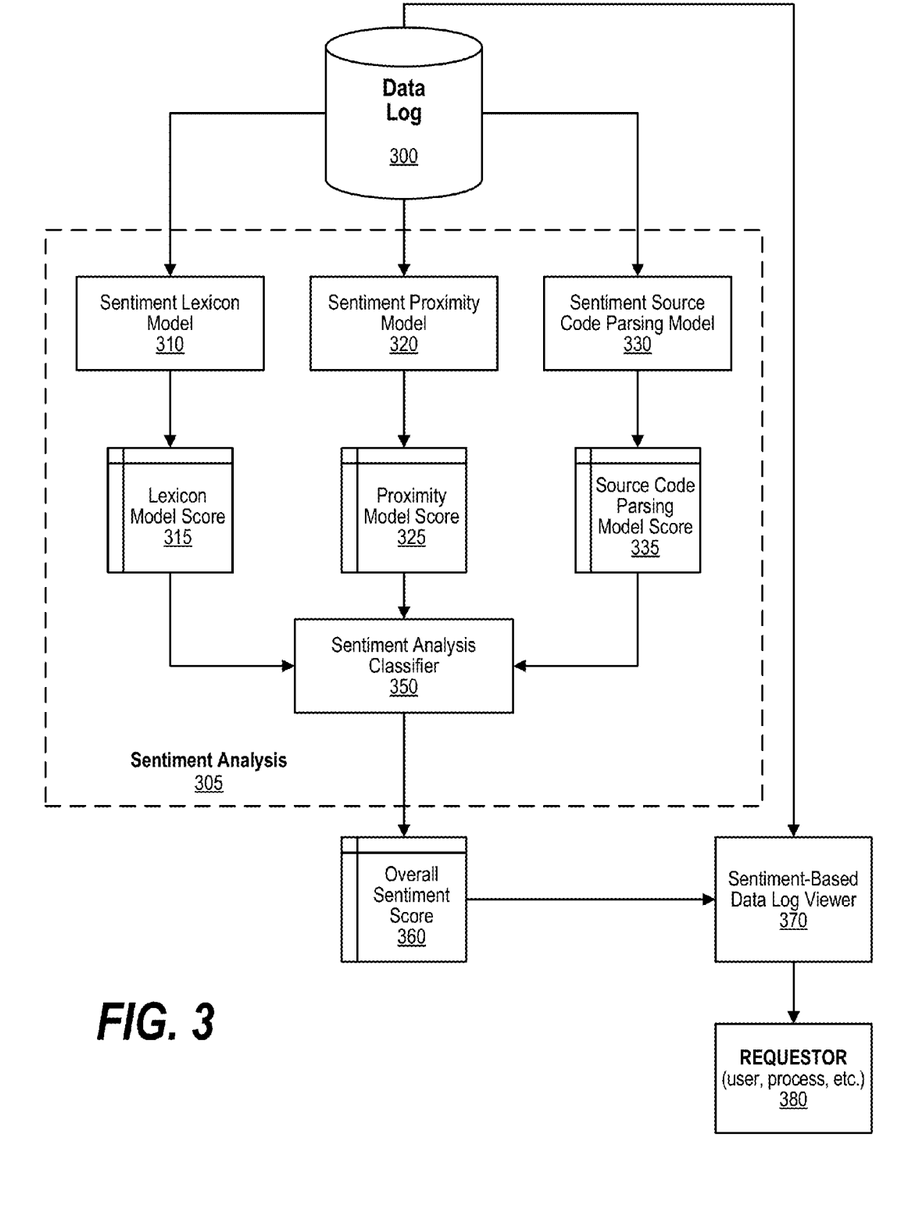
FIG. 3 is a component diagram showing the various data stores and processes used in performing a sentiment analysis on a data log.

FIG. 3 is a component diagram showing the various data stores and processes used in performing a sentiment analysis on a data log. As used herein, data log 300 is a log generated during execution of a software program such as when tracing is turned on or debug information is output from the program. In software engineering, tracing generates data log 300 into which information about the program's execution is recorded. This information is typically used by programmers for debugging purposes, and additionally, depending on the type and detail of information contained in a trace log, by experienced system administrators or technical support personnel and software monitoring tools to diagnose common problems with software. Because a trace of a program execution can result in a very large number of entries being written to data log 300, analysis of the raw data log by programmers or developers that are attempting to identify and address a problem with a program's execution (e.g., software bug, etc.) can be extremely tedious and time consuming. To address these challenges, sentiment analysis 305 is performed on data log 300 in order to identify and highlight entries in data log 300 that have high sentiment scores and, therefore, are more likely to be related to a problem being experienced with the program's execution than entries with lower sentiment scores.

In one embodiment, sentiment analysis 305 utilizes three different sentiment models to generate an overall sentiment score. Sentiment lexicon model 310 may represent lexicon dictionary that examines key words or phrases such as "failed" or "doesn't work". The lexicon would be aware of phrases or words that imply a negative connotation in the debug or trace data found in data log 300. These words or phrases are matched to a knowledge base for the product or program base, such that certain situations that are negative in relation to the context that is being used will be appropriate. For example, in one program environment, an MQ binary message is expected to have an MQ Header Type RHC. The result of sentiment lexicon model 310 is lexicon model score 315.

Sentiment proximity model 320 represents a proximity. The idea leveraged by the sentiment proximity model is that trace or debug statements found in data log 300 entries that have potential negative connotation would be in close proximity to well known or documented error messages. The result of sentiment proximity model 320 is proximity model score 325.

Sentiment source code parsing model 330 represents the parsing of the program source code corresponding to the program that was executed to create data log 300. In sentiment source code parsing model 330 the identifying of phrases that occur in areas of negative connotation are identified and scored. For example, debug or trace entries found in data log 300 that is provided in a catch clause, or entries that are found right before an exception being thrown in the program source code. The result of sentiment source code parsing model 330 is source code parsing model score 335.

Sentiment analysis classifier 350 is a process used to combine lexicon model score 315, proximity model score 325, and source code parsing model score 335 and generate overall sentiment score 360. The overall sentiment score is used by sentiment-based data log viewer 370 to highlight those entries from data log 300 that have high sentiment scores in order to distinguish entries with high sentiment scores from entries with lower sentiment scores. In one embodiment, sentiment analysis classifier 350 is a classifier that takes as input the weighted values that each model generated. In this embodiment, classifier 350 provides a weighting against each model to produce a final value which is the overall sentiment score for a given entry, or set of entries, in data log 300. Highlighted data log entries from data log 300 are provided by sentiment-based data log viewer 370 to requestor 380. For example, requestor 380 could be a programmer or developer investigating the performance or diagnosing a bug in a particular software program.

Figure 4:
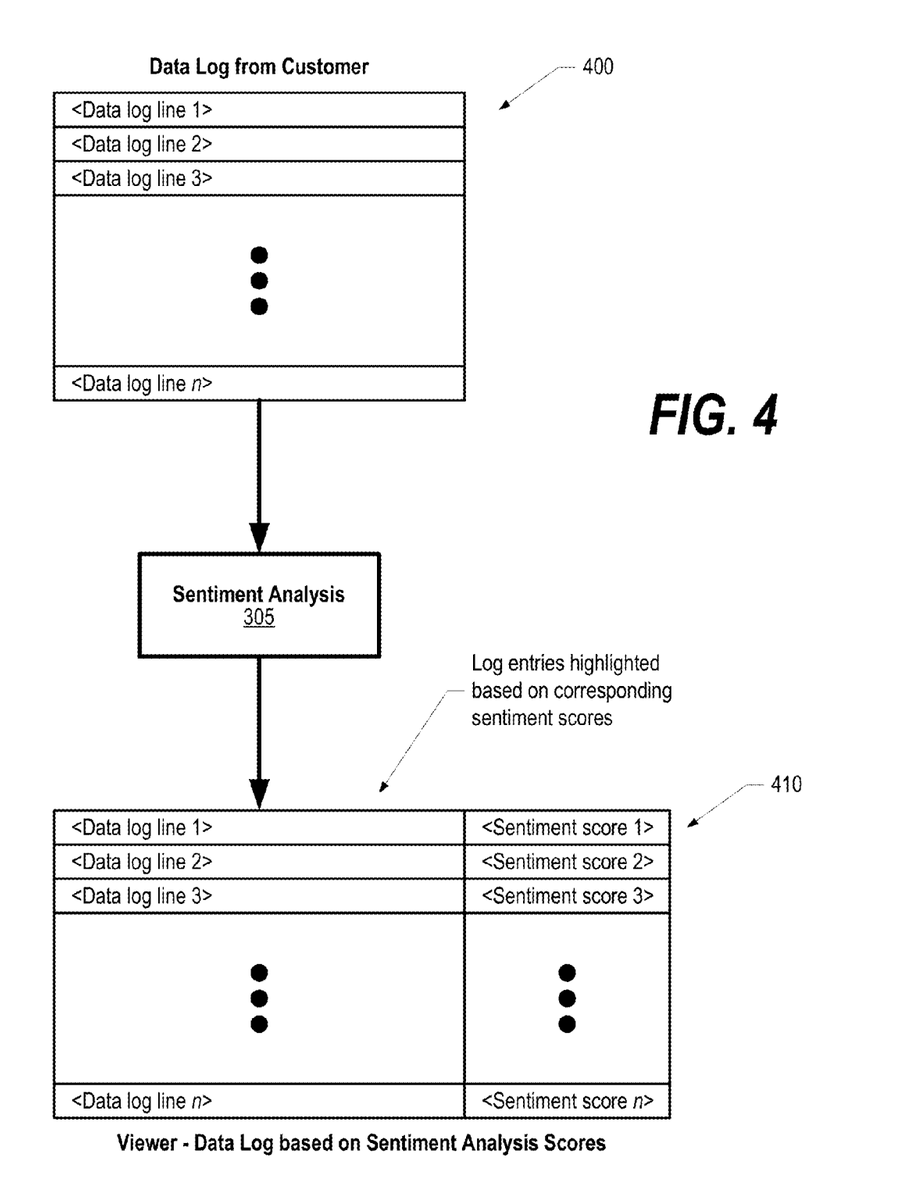
FIG. 4 is a depiction of a data log being processed for sentiment content with the resulting data log having entries highlighted based upon their corresponding sentiment scores.

FIG. 4 is a depiction of a data log being processed for sentiment content with the resulting data log having entries highlighted based upon their corresponding sentiment scores. Data log 400 is a raw data log resulting from executing of a program with tracing turned 'on' and/or debug statements output to a data log file. Sentiment analysis 305, as described in FIG. 3, processes data log 400 to generate modified data log 410 with the modified data log being modified to include the sentiment scores pertaining to entries within the data log. As shown, each entry within the data log can be individually scored or, in an alternate embodiment, sets of entries within the data log can be processed together with a sentiment score that applies to the set of entries. The data log viewer can display the sentiment scores pertaining to the various entries within the data log in order to highlight entries with higher sentiment scores. The programmer or developer can scan highlighted data log 410 to spot entries with higher sentiment scores. Likewise, the data log viewer can use the sentiment scores that pertain to the various entries in order to further highlight such entries, such as displaying such entries in bold typeface or use other visual highlighting techniques to highlight such entries. In addition, highlighting of the data log may include filtering the data log so that data log entries with low sentiment scores are filtered out and not shown in highlighted data log 410. Such filtering may be useful in environments where data log 400 resulting from the program execution is exceeding large. Furthermore, visually highlighting can include a display mode that displays the data log entries with high or low sentiment scores resulting in lieu of displaying a segment of the data log and highlighting the individual data log entries.

Figure 5:
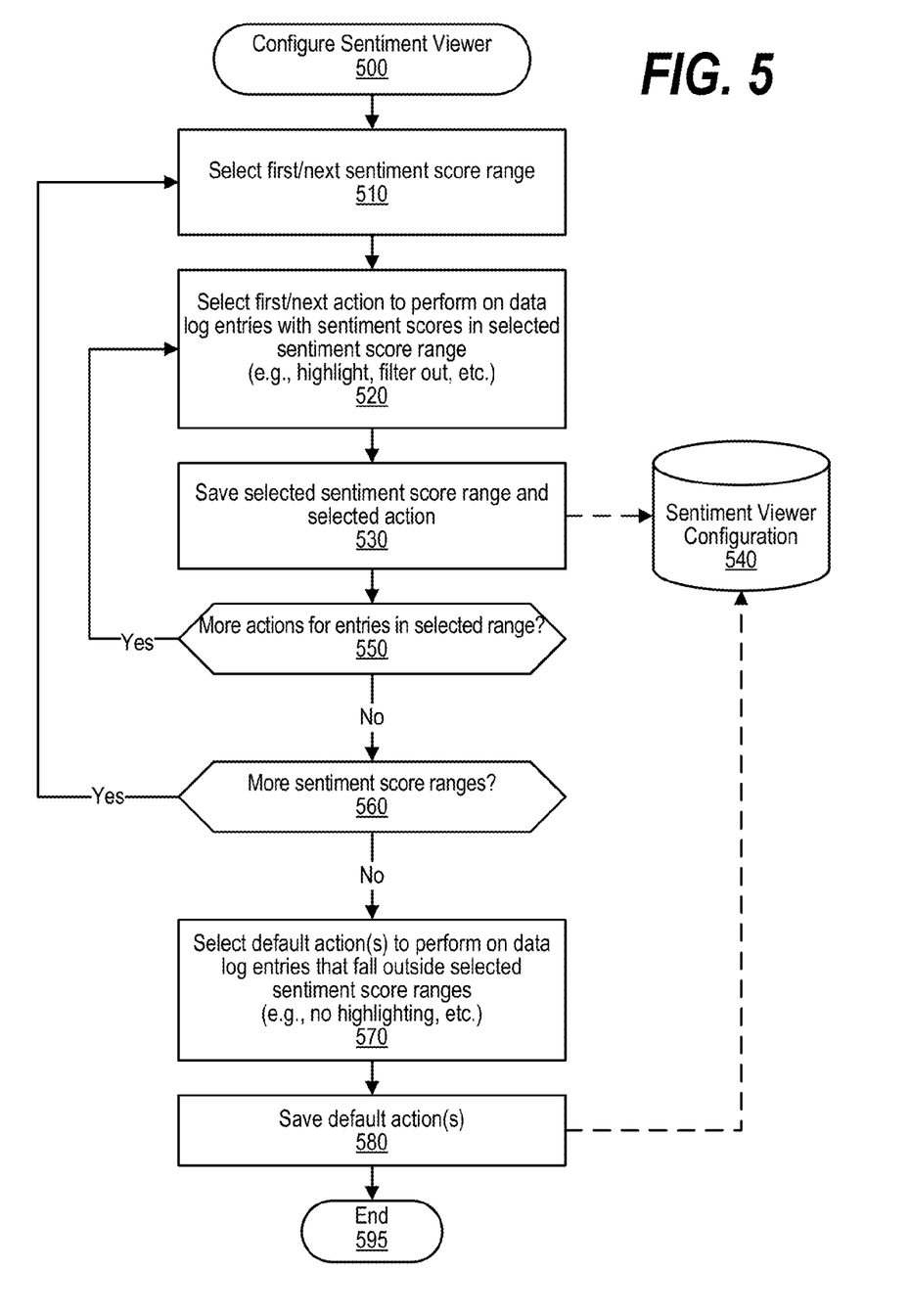
FIG. 5 is a depiction of a flowchart showing the logic used to configure a sentiment viewer.

FIG. 5 is a depiction of a flowchart showing the logic used to configure a sentiment viewer. Sentiment viewer configuration processing commences at 500 whereupon, at step 510, the first sentiment score range is selected. For example, if sentiment scores resulting from sentiment analysis of data logs fall in the range of 1 to 100, a first range may be set at 90 to 100. At step 520, the user selects the first action that the viewer should perform on data log entries that fall within the selected sentiment score range. For example, for entries with high sentiment scores (e.g., 90-100 from the example above, etc.), the viewer could be configured to increase the font size from 12 to 16 as well as display the entry in boldface type. At step 530, the selected sentiment score range is saved in configuration data store 540 along with the action that is to be performed for entries with sentiment scores that fall into the selected range. A decision is made as to whether additional actions are to be performed for entries that fall in the selected sentiment score range (decision 550). If additional actions are to be performed, then decision 550 branches to the "yes" branch which loops back to receive the next action selection (step 520) and save the selected range and action (step 530). This looping continues until all of the actions that the user wishes to have performed for data entries that fall in the selected sentiment score range have been selected and saved, whereupon decision 550 branches to the "no" branch.

A decision is made as to whether there are additional sentiment score ranges that the user wishes to configure (decision 560). For example, using a system with sentiment scores that can vary from 1 to 100, a second range may be set at 80-89 with these entries being bolded and italicized but not displayed in a larger font size. If more sentiment score ranges are desired, then decision 560 branches to the "yes" branch which loops back to select the next sentiment score range (e.g., 80-89 using the above example, etc.) and processing receives the action selections pertaining to the newly selected sentiment score range as described above. Low sentiment score ranges can also be selected with actions selected that deemphasize data log entries with low sentiment scores. For example, the user may wish to filter out data log entries with particularly low sentiment scores (e.g., 1-25 using the above 1-100 sentiment score scale, etc.). The user can also choose to deemphasize data log entries by reducing the font size used to display such data log entries (e.g., reducing the font size from 12 to 8, etc.). This looping continues until all desired sentiment score ranges have been selected and configured as described above, at which point decision 560 branches to the "no" branch.

At step 570, default actions are selected to be performed on data log entries that fall outside of the selected sentiment score ranges set in steps 510 through 560. For example, a default action might be to set a default font size (e.g., font size of 12, etc.) and to not highlight or filter out such data log entries. At step 580, such default actions are stored in configuration data store 540. Sentiment viewer configuration processing thereafter ends at 595.

Figure 6:
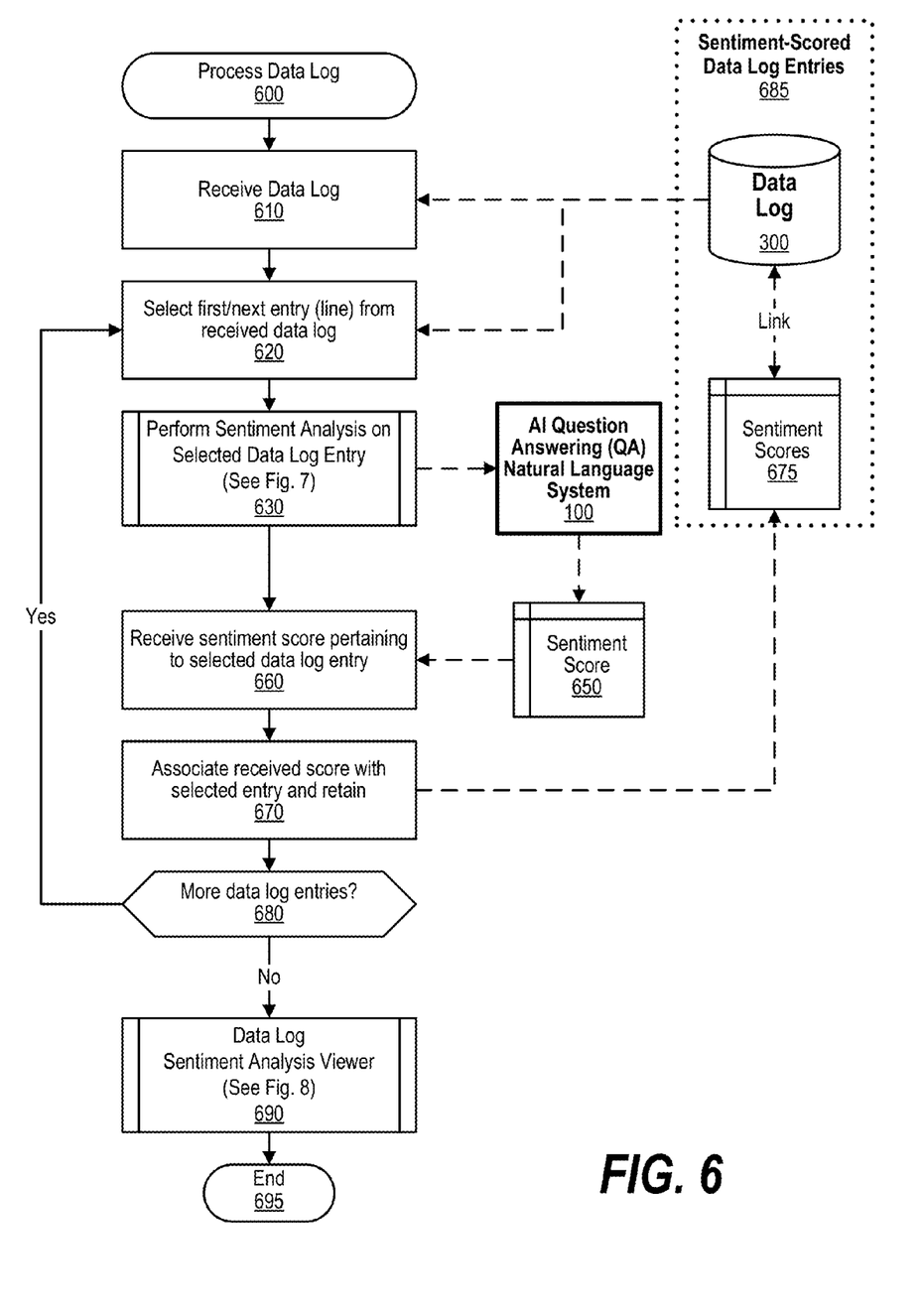
FIG. 6 is a depiction of a flowchart showing the logic used to process a data log for sentiment content.

FIG. 6 is a depiction of a flowchart showing the logic used to process a data log for sentiment content. Data log processing commences at 600 whereupon, at step 610, the process receives data log 300 for processing using sentiment analysis.

At step 620, the process selects the first entry (or set of related entries) from received data log file 300. At predefined process 630, the selected data log entry (or set of related entries) is analyzed using sentiment analysis (see FIG. 7 and corresponding text for processing details). In one embodiment, the data log is processed by AI Question Answering (QA) Natural Language System, such as the Watson™ system developed by International Business Machines Corporation. AI Question Answering Natural Language System 100 is able to analyze data log 300 using a variety of sentiment models as shown in FIG. 3. In one embodiment, data log 300 is processed by a Sentiment Lexicon Model that results in a Lexicon Model Score, a Sentiment Proximity Model that results in a Proximity Model Score, and a Sentiment Source Code Parsing Model that results in a Source Code Parsing Model Score. Other models could be used in addition, or in lieu of, the above listed models depending on the type of data log being analyzed. The result of predefined process 630 is a sentiment score that pertains to the selected data log entry (or set of entries). The sentiment score is received by the process from AI Question Answering Natural Language System 100 at step 660. At step 670, process associates the received sentiment score with the selected entry and retains the sentiment score in memory area 675. The combination of sentiment scores 675 with data log 300 result in sentiment-scored data log entries 685. In one embodiment, data log is modified at step 670 with the sentiment score being appended to its associated data log entry.

A decision is made as to whether there are more data log entries in data log file 300 to process (decision 680). If there are more data log entries to process, processing branches to the "yes" branch which loops back to step 620 to select and process the next data log entry from data log 300. This looping continues until all of the data log entries have been processed, at which point decision 680 branches to the "no" branch.

Figure 8:
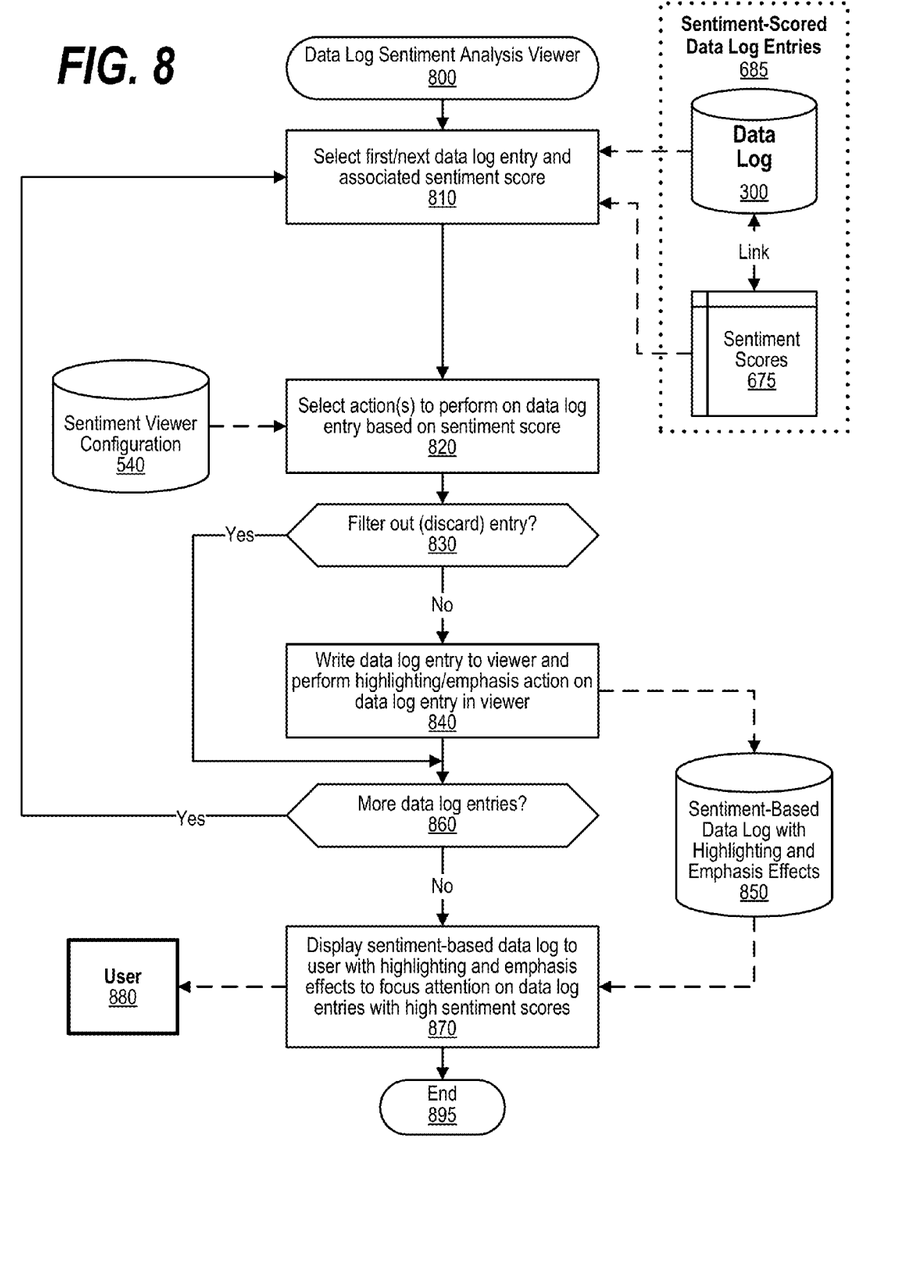
FIG. 8 is a depiction of a flowchart showing the logic used to display a data log using the configured sentiment analysis data log viewer.

At predefined process 690, the data log sentiment analysis viewer receives the data log entries from data log 300 and each entry's associated sentiment score and displays the data log in a highlighted fashion according to the configuration settings applied by the user in FIG. 5 (see FIG. 8 and corresponding text for processing details regarding the processing of the data log sentiment analysis viewer). Data log processing thereafter ends at 695.

Figure 7:
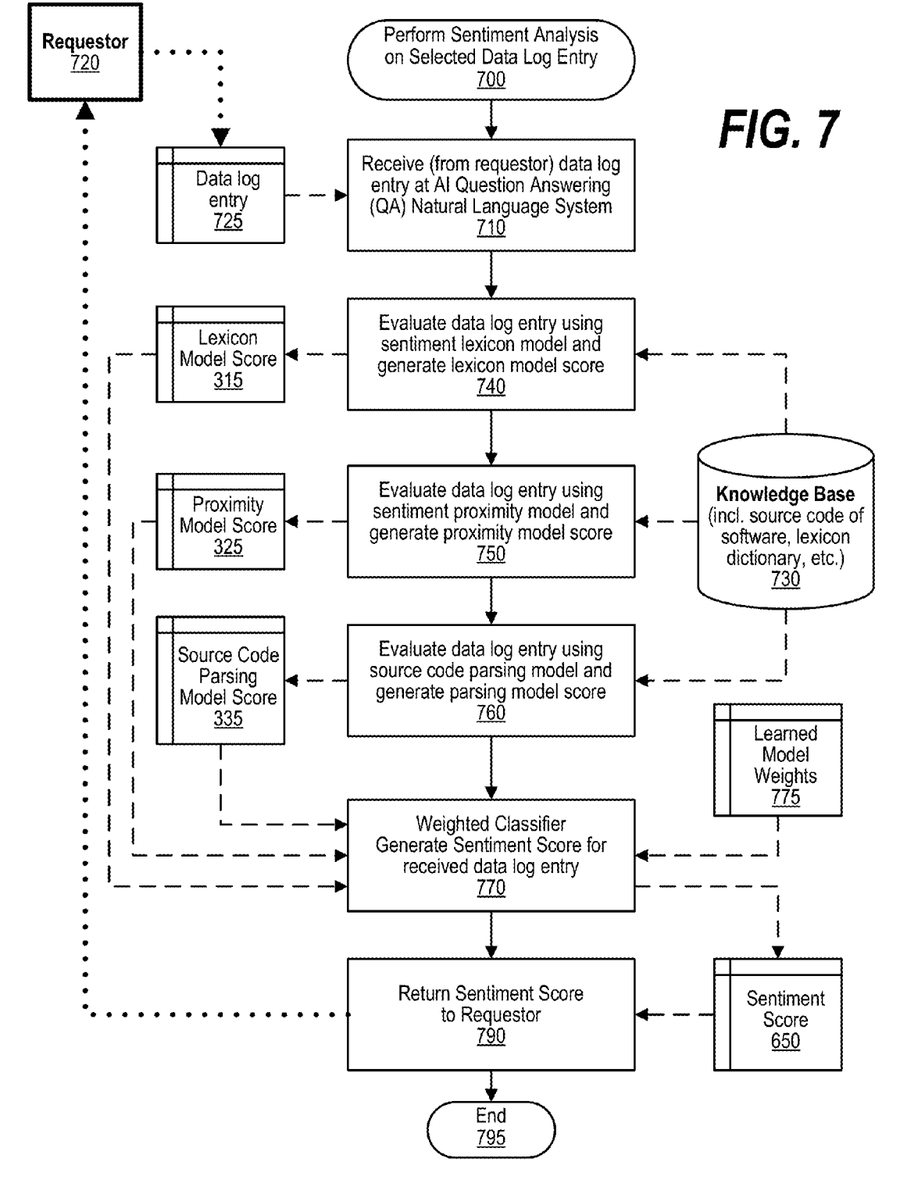
FIG. 7 is a depiction of a flowchart showing the logic used to perform a sentiment analysis on a selected entry of the data log.

FIG. 7 is a depiction of a flowchart showing the logic used to perform a sentiment analysis on a selected entry of the data log. Processing performed by the AI Question Answering (QA) Natural Language System to perform sentiment analysis on a selected data log entry (or set of entries) commences at 700 whereupon, at step 710, the AI Question Answering (QA) Natural Language System receives data log entry 725 from requestor 720 with requestor 720 being the process shown in FIG. 6. The AI Question Answering (QA) Natural Language System utilizes knowledge base 730 and a variety of sentiment models to generate sentiment scores related to the received data log entry. Knowledge base 730 includes the source code of the program that was used to generate the data log, a lexicon dictionary that sets for the positive and negative connotation of words and phrases within various contexts, and a plethora of information available from computer networks, such as the Internet, as well as vast locally-accessible data sources.

At step 740, the AI Question Answering (QA) Natural Language System evaluates the data log entry using the sentiment lexicon model and knowledge base 730 in order to generate a lexicon model score pertaining to the entry that is stored in memory area 315.

At step 750, the AI Question Answering (QA) Natural Language System evaluates the data log entry using the sentiment proximity model and knowledge base 730 in order to generate a proximity model score pertaining to the entry that is stored in memory area 325.

At step 760, the AI Question Answering (QA) Natural Language System evaluates the data log entry using the source code parsing model and knowledge base 730 in order to generate a source code parsing model score pertaining to the entry that is stored in memory area 335.

At step 770, the scores resulting from processing the data log entry using the various models is processed by a weighted classifier process that takes, as inputs, the lexicon model score, the proximity model score, and the source code parsing model score along with learned model weights 775 that pertain to the various models in order to generate an overall sentiment score that is stored in memory area 650. In one embodiment, the learned model weights apply weighting factors to the various model scores so that the scores can be treated differently (e.g., emphasizing the lexicon model score, etc.) by the weighted classifier. At step 790, the process returns the sentiment score to requestor 720, such as the process shown in FIG. 6. Processing performed by the AI Question Answering (QA) Natural Language System to perform sentiment analysis on the selected data log entry thereafter ends at 795.

FIG. 8 is a depiction of a flowchart showing the logic used to display a data log using the configured sentiment analysis data log viewer. Processing performed by the data log sentiment analysis viewer commences at 800 whereupon, at step 810, the process selects the first data log entry from data log 300 and the sentiment score from memory area 675 that corresponds to the selected data log entry.

At step 820, one or more configured actions are selected from data store 540 to be performed on the selected data log entry based on the data log entry's sentiment score. The actions that are performed were previously configured by the user as depicted in the flowchart shown in FIG. 5. For example, the user may have configured data log entries with high sentiment scores to be highlighted with boldface type and an increased font size. Conversely, the user may have configured data log entries with low sentiment scores to be either filtered out (not shown in the viewer) or deemphasized by displaying the entries in a smaller font size. The actions to be performed on the selected data log entry are received from data store 540.

A decision is made as to whether the action is to filter out the selected data log entry (decision 830). If the action is not to filter out the data log entry based on the entry's sentiment score, then decision 830 branches to the "no" branch whereupon, at step 840, the selected data log entry is written (e.g., rendered, etc.) to the viewer and highlighted as set forth in the viewer configuration (e.g., bold typeface, increased font size, etc.). The data log entry with highlighting is written to data store 850. Returning to decision 830, if the selected data log entry is to be filtered out based on the entry's sentiment score, then decision 830 branches to the "yes" branch which bypasses step 840 so that the data log entry is not written to data store 850.

A decision is made as to whether there are more data log entries in data log 300 to process (decision 860). If there are more data log entries to process, then decision 860 branches to the "yes" branch which loops back to select and process the next data log entry. This looping continues until all of the data log entries have been processed, at which point decision 860 branches to the "no" branch.

At step 870, the process displays the sentiment-based data log to user 880 using the highlighting and emphasis configured by the user to focus the user's attention on data log entries with higher sentiment scores. Additionally, data log entries with low sentiment scores either do not appear in the view (having been filtered out by decision 830) or such low score entries are deemphasized, such as by displaying such entries using smaller font sizes, etc. Processing performed by the data log sentiment analysis viewer thereafter ends at 895.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of utilizing natural language processing (NLP) to analyze data logs, the method comprising:
   generating a data log in response to executing a software application, wherein the data log includes a plurality of entries that each comprise debugging data generated from execution of the software application;
   performing a sentiment analysis on the data log, wherein the sentiment analysis further comprises:
      identifying at least one negative connotation corresponding to at least one term located in at least a selected one of the plurality of entries;
      determining that the selected entry is within a predetermined spatial proximity of at least one known error message in the data log; and
      generating a proximity model score in response to the determination;
   generating a sentiment score for the selected entry based upon the proximity model score; and
   identifying for visual highlighting the selected entry based on the sentiment score.

2. The method of claim 1 wherein the analyzing further comprises:
   utilizing one or more models to analyze the plurality of entries, wherein the models are selected from the group consisting of a sentiment lexicon model, a sentiment proximity model, and a sentiment source code parsing model.

3. The method of claim 1 further comprising:
   evaluating the plurality of entries using a sentiment lexicon model, wherein the evaluation using the sentiment lexicon model is based on a comparison of one or more terms found in one or more of the entries with a knowledge base to generate a lexicon model score, wherein the lexicon model score is used to compute the sentiment score.

4. The method of claim 3 further comprising:
   evaluating the plurality of entries using a source code parsing model, wherein the evaluation using the source code parsing model is based on the negative connotation found in one or more areas of negative connotation in a related source code corresponding to the software application, the evaluation using the source code parsing model generates a source code parsing model score that is used to compute the sentiment score.

5. The method of claim 4 further comprising:
   receiving a set of learned model weights;
   using a weighted classifier to combine the learned model weights with the lexicon model score, the proximity model score, and the source code parsing model score to generate a set of sentiment scores that correspond to each of the plurality of entries; and
   highlighting a first set of one or more of the plurality of entries based on the set of sentiment scores corresponding to a set of highlighted entries.

6. The method of claim 1 wherein the visually highlighting further comprises:
   displaying the sentiment score associated with the selected entry.

7. An information handling system comprising:
   one or more processors;
   a memory coupled to at least one of the processors;
   a set of instructions stored in the memory and executed by at least one of the processors to analyze data logs using natural language processing, wherein the set of instructions perform steps of:
      generating a data log in response to executing a software application, wherein the data log includes a plurality of entries that each comprise debugging data generated from execution of the software application;
      performing a sentiment analysis on the data loci, wherein the sentiment analysis further comprises:
         identifying at least one negative connotation corresponding to at least one term located in at least a selected one of the plurality of entries;
         determining that the selected entry is within a predetermined spatial proximity of at least one known error message in the data log; and
         generating a proximity model score in response to the determination;
      generating a sentiment score for the selected entry based upon the proximity model score; and
      identifying for visual highlighting the selected entry based on the sentiment score.

8. The information handling system of claim 7 wherein the analyzing further comprises steps of:

utilizing one or more models to analyze the plurality of entries, wherein the models are selected from the group consisting of a sentiment lexicon model, a sentiment proximity model, and a sentiment source code parsing model.

9. The information handling system of claim 7 wherein the set of instructions perform further steps comprising:
evaluating the plurality of entries using a sentiment lexicon model, wherein the evaluation using the sentiment lexicon model is based on a comparison of one or more terms found in one or more of the entries with a knowledge base to generate a lexicon model score, wherein the lexicon model score is used to compute the sentiment score.

10. The information handling system of claim 9 wherein the set of instructions perform further steps comprising:
evaluating the plurality of entries using a source code parsing model, wherein the evaluation using the source code parsing model is based on the negative connotation found in one or more areas of negative connotation in a related source code corresponding to the software application, the evaluation using the source code parsing model generates a source code parsing model score that is used to compute the sentiment score.

11. The information handling system of claim 10 wherein the set of instructions perform further steps comprising:
receiving a set of learned model weights;
using a weighted classifier to combine the learned model weights with the lexicon model score, the proximity model score, and the source code parsing model score to generate a set of sentiment scores that correspond to each of the plurality of entries;
highlighting a first set of one or more of the plurality of entries based on the set of sentiment scores corresponding to a set of highlighted entries; and
filtering out a second set of entries that have low sentiment scores, wherein the second set of entries is not displayed with the first set of entries.

12. A computer program product stored in a non-transitory computer readable medium, comprising computer instructions that, when executed by an information handling system, causes the information handling system to perform steps comprising:
generating a data log in response to executing a software application, wherein the data log includes a plurality of entries that each comprise debugging data generated from execution of the software application;
performing a sentiment analysis on the data loci, wherein the sentiment analysis further comprises:
identifying at least one negative connotation corresponding to at least one term located in at least a selected one of the plurality of entries;
determining that the selected entry is within a predetermined spatial proximity of at least one known error message in the data loci; and
generating a proximity model score in response to the determination;
generating a sentiment score for the selected entry based upon the proximity model score; and
identifying for visual highlighting the selected entry based on the sentiment score.

13. The computer program product of claim 12 wherein the analyzing further comprises:
utilizing one or more models to analyze the plurality of entries, wherein the models are selected from the group consisting of a sentiment lexicon model, a sentiment proximity model, and a sentiment source code parsing model.

14. The computer program product of claim 12 wherein the computer instructions cause the information handling system to perform further steps comprising:
evaluating the plurality of entries using a sentiment lexicon model, wherein the evaluation using the sentiment lexicon model is based on a comparison of one or more terms found in one or more of the entries with a knowledge base to generate a lexicon model score, wherein the lexicon model score is used to compute the sentiment score.

15. The computer program product of claim 14 wherein the computer instructions cause the information handling system to perform further steps comprising:
evaluating the plurality of entries using a source code parsing model, wherein the evaluation using the source code parsing model is based on the negative connotation found in one or more areas of negative connotation in a related source code corresponding to the software application, the evaluation using the source code parsing model generates a source code parsing model score that is used to compute the sentiment score.

16. The computer program product of claim 15 wherein the computer instructions cause the information handling system to perform further steps comprising:
receiving a set of learned model weights;
using a weighted classifier to combine the learned model weights with the lexicon model score, the proximity model score, and the source code parsing model score to generate a set of sentiment scores that correspond to each of the plurality of entries; and
highlighting a first set of one or more of the plurality of entries based on the set of sentiment scores corresponding to a set of highlighted entries.

17. The computer program product of claim 12 wherein the visually highlighting further comprises:
displaying the sentiment score associated with the selected entry.

* * * * *